(12) United States Patent
Babazadeh et al.

(10) Patent No.: US 9,110,480 B2
(45) Date of Patent: Aug. 18, 2015

(54) VOLTAGE RAMP CIRCUITRY AND VOLTAGE RAMP METHODS FOR VOLTAGE REGULATORS

(75) Inventors: Amir Babazadeh, Irvine, CA (US); Benjamim Tang, Rancho Palos Verdes, CA (US); Jinghong Guo, Torrance, CA (US); Scott Southwell, Seal Beach, CA (US); Tim Ng, Monterey Park, CA (US); Richard Pierson, Newport Beach, CA (US); Nick Steffen, Redondo Beach, CA (US)

(73) Assignee: Infineon Technologies Austria AG, Villach (AT)

(*) Notice: Subject to any disclaimer, the term of this patent is extended or adjusted under 35 U.S.C. 154(b) by 316 days.

(21) Appl. No.: 13/155,282

(22) Filed: Jun. 7, 2011

(65) Prior Publication Data

US 2014/0043008 A1   Feb. 13, 2014

Related U.S. Application Data

(60) Provisional application No. 61/353,161, filed on Jun. 9, 2010.

(51) Int. Cl.
*G05F 1/00* (2006.01)
*G05F 3/02* (2006.01)
*H02M 3/156* (2006.01)
*H02M 1/00* (2007.01)

(52) U.S. Cl.
CPC .............. *G05F 3/02* (2013.01); *H02M 3/156* (2013.01); *H02M 2001/0025* (2013.01)

(58) Field of Classification Search
CPC ............... H02M 1/44; H02M 3/156; H02M 2001/0025; H02M 2001/0003; G05F 1/46; G05F 3/02
USPC .......... 323/242, 282, 285, 288, 326; 327/131, 327/133, 134, 135, 136, 137, 138, 139, 140, 327/538
See application file for complete search history.

(56) References Cited

U.S. PATENT DOCUMENTS

| | | | |
|---|---|---|---|
| 7,489,121 B2 * | 2/2009 | Qiu et al. | 323/288 |
| 7,834,608 B2 * | 11/2010 | Cheng et al. | 323/299 |
| 8,080,987 B1 * | 12/2011 | Qiu et al. | 323/288 |
| 2007/0080675 A1 * | 4/2007 | Gray et al. | 323/282 |
| 2009/0121695 A1 * | 5/2009 | Pierson et al. | 323/283 |
| 2011/0316508 A1 * | 12/2011 | Cheng et al. | 323/282 |

* cited by examiner

*Primary Examiner* — Nguyen Tran
*Assistant Examiner* — Lakaisha Jackson
(74) *Attorney, Agent, or Firm* — Murphy, Bilak & Homiller, PLLC

(57) ABSTRACT

Methods and apparatus for power regulation according to various aspects of the present invention may operate in conjunction with producing a voltage ramp starting at a first voltage and ending at a second voltage and compensating the voltage ramp according to a compensation parameter. The compensation parameter may be adapted to compensate for a circuit parameter. A voltage may then be generated according to the compensated voltage ramp.

30 Claims, 9 Drawing Sheets

VOLTAGE RAMP CIRCUITRY AND VOLTAGE RAMP METHODS FOR VOLTAGE REGULATORS

CROSS-REFERENCES TO RELATED APPLICATIONS

This application claims the benefit of U.S. Provisional Patent Application No. 61/353,161, entitled Method and Apparatus for Dynamic Voltage Transition, filed Jun. 9, 2010, and incorporates the disclosure of such application by reference.

BACKGROUND OF INVENTION

Regulated power supplies or voltage regulators are typically required to provide the voltage and current supply to microelectronic devices. The voltage regulator is designed to deliver power from a primary source to an electrical load at the specified current, voltage, and power efficiency. Switching power converters (SPCs) are commonly used voltage regulators due to their high efficiency, high current capability, and topology flexibility. In addition, SPCs can be designed to provide very precise voltage and current characteristics required by devices such as microprocessors, microcontrollers, memory devices, and the like.

Power requirements for emerging leading edge technology microprocessors have become very difficult to satisfy. As the speed and integration of the microprocessors increases, the demands on the power regulation system also increase. In particular, as the gate counts increase, the power regulation current demand increases, the operating voltage decreases and the transient events (e.g., relatively large voltage spikes or droops at the load) typically increase in both magnitude and frequency.

SPCs utilizing step-down multi-phase buck converters have been the preferred topology to meet the low voltage and high current requirements of microprocessors. With the advent of increasingly complex power regulation topologies, digital techniques for power converter control can improve precision and reduce the system's total parts count while also supporting multiple applications in the same power system through digitally programmable feedback control.

SUMMARY OF THE INVENTION

Methods and apparatus for power regulation according to various aspects of the present invention may operate in conjunction with producing a voltage ramp starting at a first voltage and ending at a second voltage and compensating the voltage ramp according to a compensation parameter. The compensation parameter may be adapted to compensate for a circuit parameter. A voltage may then be generated according to the compensated voltage ramp.

BRIEF DESCRIPTION OF THE DRAWINGS

A more complete understanding of the present invention may be derived by referring to the detailed description and claims when considered in connection with the following illustrative figures. In the following figures, like reference numbers refer to similar elements and steps throughout the figures.

Elements and steps in the figures are illustrated for simplicity and clarity and have not necessarily been rendered according to any particular sequence. For example, steps that may be performed concurrently or in different order are illustrated in the figures to help to improve understanding of embodiments of the present invention.

DETAILED DESCRIPTION OF EXEMPLARY EMBODIMENTS

The present invention may be described in terms of functional block components and various processing steps. Such functional blocks may be realized by any number of hardware or software components configured to perform the specified functions and achieve the various results. For example, the present invention may employ various analog circuit components such as resistors, capacitors, and inductors, as well as digital logic circuits, driver circuits, voltage supplies, measurement sensors, and the like, which may carry out a variety of functions. In addition, the present invention may be practiced in conjunction with any number of circuits and systems, and the embodiments described are merely exemplary applications of the invention. Various representative implementations of the present invention may be implemented in conjunction with a voltage regulator. The voltage regulator may comprise any suitable converter, such as a converter using step-down, step-up, buck, boost, buck-boost, forward, flyback, half-bridge, full-bridge, and/or SEPIC topologies.

Generally, a buck converter may generate a switching waveform or square wave that is filtered to provide a relatively smooth output, which allows the output voltage to be regulated by controlling the duty cycle of the waveform. This is accomplished by an output inductor and the capacitor functioning as a filter, allowing for a relatively constant voltage to be supplied to the load. Because the power stage is fully switched (i.e., the power transistor is fully off or on), there is little loss in the power stage and the converter efficiency is high. While the exemplary embodiments are discussed in conjunction with a buck converter, various aspects of the present invention may be practiced in conjunction with any other suitable switching regulator topologies.

Figure 1:
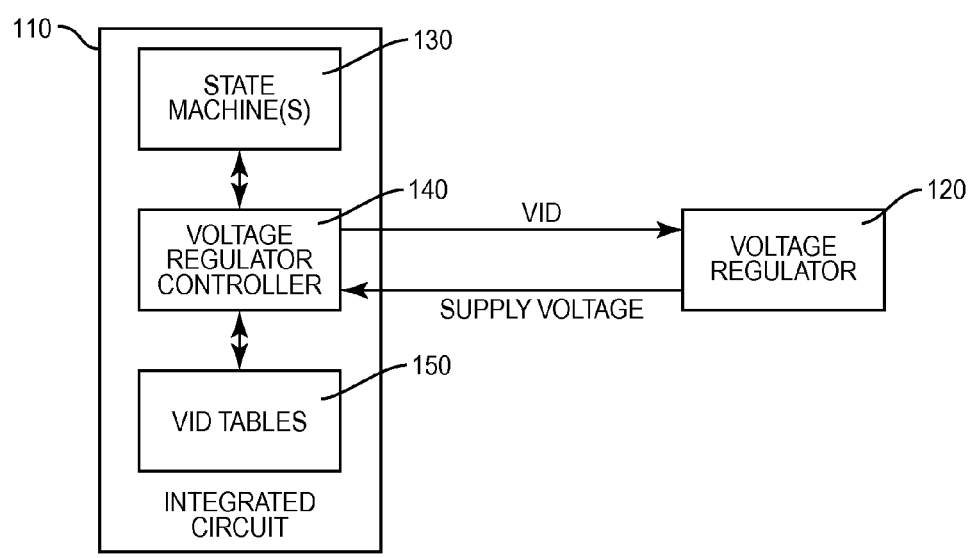
FIG. 1 is a block diagram of a load connected to a voltage regulator.

Referring to FIG. 1, a load 110 supporting dynamic operating voltage transitions may receive power from a voltage regulator 120. The load 110 may comprise any type of load 110 that receives a voltage supply from the voltage regulator 120, such as a processor, memory, circuit board, ASIC, computer, or other integrated circuit or system. The load 110 may provide a power state signal to the voltage regulator 120, such as a voltage identifier (VID) or other signal corresponding to a power requirement of the regulator, for example a desired voltage and/or current requirement. The VID may be a digital number provided by the load 110 describing the specific power requirements of the load 110. In one embodiment, the VID is used to transmit a digital representation of the desired operating voltage to the voltage regulator 120. The VID may comprise a single binary signal (serial bus) or multiple signals (parallel bus).

The power state signal may be generated in any appropriate manner and by any suitable source. For example, the power state signal may be generated directly or indirectly by the load 110, the voltage regulator 120, or other source. In the present embodiment, the load 110 generates the VID signal to indicate the required voltage to be provided by the voltage regulator 120. The load 110 may be configured in any suitable manner to generate the VID signal.

It is desirable for the voltage regulator to transition from the first output voltage to the second output voltage as quickly as possible. However, since a change in output voltage requires charging or discharging an output capacitor, the rate of change should be fixed so that the current charging or discharging the output capacitor does not exceed an operating current limit of the voltage regulator 120. In addition, once the second operating voltage is reached, it is desirable that the voltage waveform settle as quickly as possible on the second operating voltage and should have as little overshoot or undershoot as possible. Applying an ideal voltage ramp as the VID or reference to the voltage regulator 120 does not produce an identical ramp at the output voltage of the voltage regulator 120. The voltage waveform at the output of the voltage regulator 120 is affected by circuit parameters such as the amount of output capacitance generating a charge or discharge current, the equivalent series resistance (ESR) of the output capacitor causing a voltage drop due to the charging and discharging of currents, and the limited bandwidth of the voltage regulator 120. The voltage waveform at the output of the voltage regulator 120 may be improved by modifying the voltage ramp according to these circuit parameters, so that the voltage waveform may more accurately reflect the idea voltage ramp, optimizing the dynamic voltage transition.

In one embodiment, the load 110 comprises an integrated circuit including one or more state machine(s) 130, a voltage regulator controller 140, and VID tables 150. The state machine 130 may adjust the state of the load 110 and the corresponding power requirements. The operating voltage required by the load 110 may change for a number of reasons. For example, the operating voltage of an integrated circuit in a laptop computer, such as a microprocessor, may change when the laptop switches from operating using a battery to being connected to an AC power source, when the computational workload of the processor increases or decreases, when the operating frequency is changed, when the number of active processing units is changed, or when the temperature of the integrated circuit has reached a temperature threshold.

The voltage regulator controller 140 changes the VID signal according to the current state of the load 110 to reflect the power requirements of the load 110 in the new state. The VID signal may be generated in any suitable manner, such as by calculation, logic, or table lookup. In the present embodiment, the voltage level controller 140 retrieves the proper VID signal from the VID table 150 and provides the VID signal to the voltage regulator 120.

In this embodiment, the voltage regulator 120 supplies the load 110 with a voltage/current based upon the VID provided by the load 110. In the event of a change in the VID, the voltage regulator 120 may transition from a first operating voltage to a second operating voltage in a quick but controlled manner. The voltage regulator 120 may control the transition between the two voltages to inhibit a sudden change in voltage that may cause undesirable effects such as noise, feedback, or current in excess of the circuit's current limits. The voltage transition may also be controlled so that the load 110 can continue to operate normally throughout the voltage transition.

In various embodiments, the voltage regulator 120 may operate in conjunction with a maximum voltage ramp rate dependent upon the capability of the voltage regulator 120 and the environment in which the load 110 is operating. For example, in environments with large decoupling capacitance or with voltage regulators with lower peak current capability, the transition between the first operating voltage and the second operating voltage may comprise lower ramp rates than environments with lower decoupling capacitance and/or voltage regulators with higher peak current capability. The peak current demand on the voltage regulator 120 may be dependent upon both the operating frequency and the decoupling capacitance that must be charged or discharged during a transition. It is also possible that an environment with high operating frequency may further require a different ramp rate than an environment having a lower operating frequency. Also, the down-ramp rate may be different than the up-ramp rate, since the voltage regulator 120 may have different source and sink current limitations.

Figure 2:
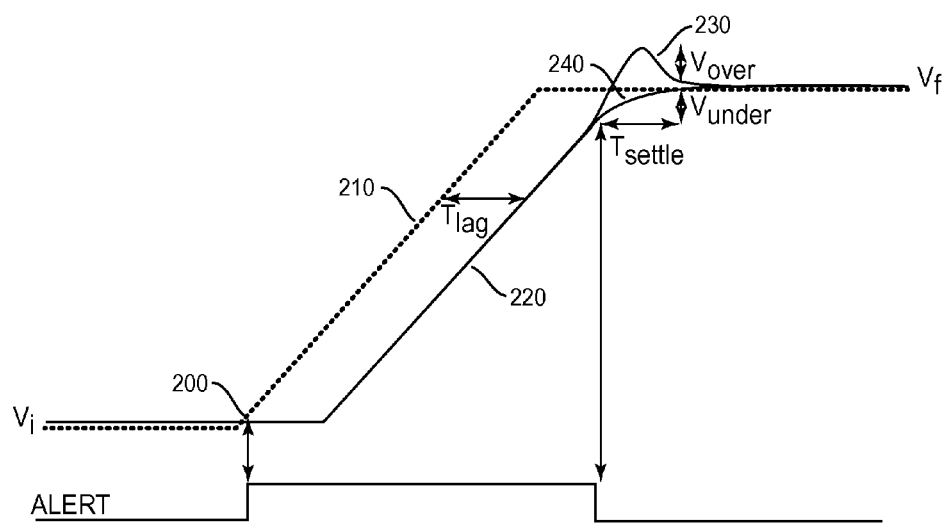
FIG. 2 illustrates an output voltage transition from a lower operating voltage to a higher operating voltage.

Referring to FIG. 2, a voltage regulator 120 according to various aspects of the present invention may generate and/or respond to a VID ramp 210 and generate an output voltage 220. Initially, the voltage regulator 120 may supply a first output voltage $V_i$ to the load 110 according to a first VID. The output voltage 220 increases at approximately the same rate as the VID ramp 210, but may lag $T_{lag}$ the VID ramp 210. The output voltage 220 may overshoot ($V_{over}$) 230 or undershoot ($V_{under}$) 240 the second VID $V_f$ depending on circuit conditions.

An alert signal may be asserted, such as by the voltage regulator 120, the load 110, or another element, according to the transition to the second output voltage $V_f$. The alert signal may be switched according to any suitable criteria, such as substantially simultaneously with a change in the VID and arrival at the second output voltage $V_f$. In the present embodiment, the alert signal is switched when the load 110 supplies the second VID $V_f$ to the voltage regulator 120. The alert signal is switched again when the second output voltage $V_f$ is achieved. In one embodiment, there may be a settling period $T_{settle}$ between switching the alert signal and the output voltage 220 settling at the second output voltage $V_f$.

In one embodiment, a compensated VID ramp is generated, for example by the load 110 and/or the voltage regulator 120, to minimize the transition time between when the new VID may be provided by the load 110 and when the voltage regulator 120 supplies that voltage. Thus, in addition to achieving the highest acceptable slew rate, the lag time $T_{lag}$ and the settling time $T_{settle}$ are minimized.

Figure 3:
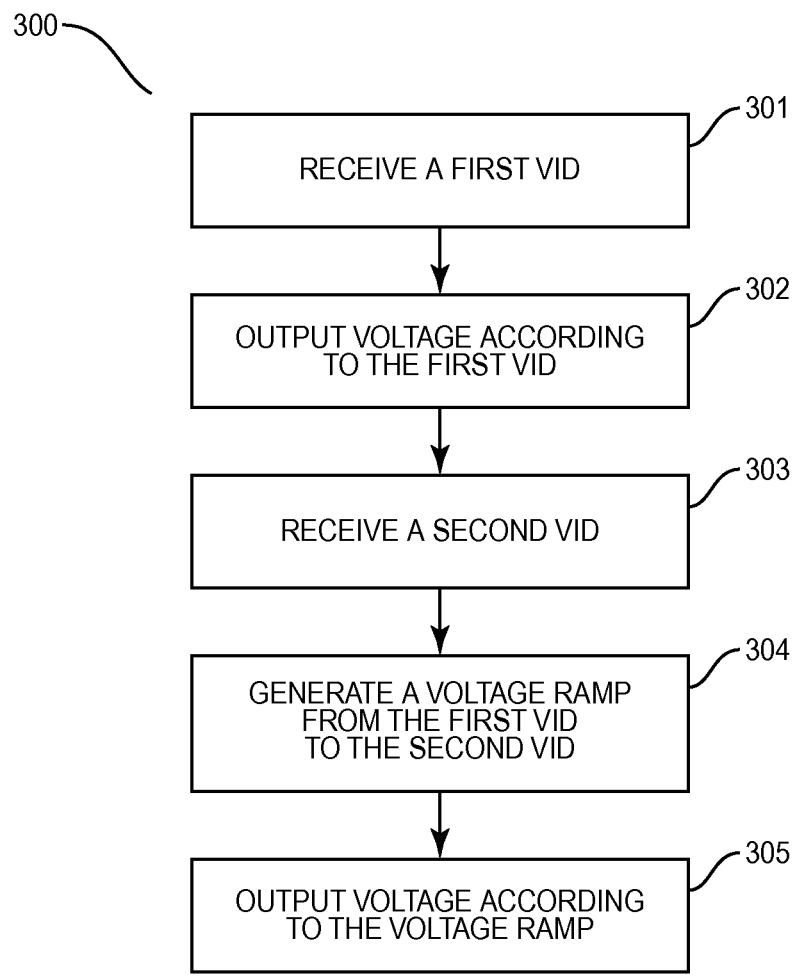
FIG. 3 illustrates a process for generating a voltage ramp.

Referring to FIG. 3, an exemplary method (300) of transitioning between operating voltages according to various aspects of the present invention may comprise the load 110 providing the first VID to the voltage regulator 120 (301). The voltage regulator 120 may provide a voltage to the load 110 as prescribed by the first VID (302). When the voltage requirements of the load 110 changes, the load 110 may provide a second VID to the voltage regulator 120 (303). The voltage regulator 120 then produces a VID ramp from the first VID to the second VID (304) and outputs a voltage according to the VID ramp (305).

The VID ramp may comprise any appropriate transition signal, such as a linear, stepped, or curvilinear signal. In one embodiment, the VID ramp may comprise a series of discrete voltage increments between $V_1$ and $V_f$. In one embodiment, the discrete voltage increments comprise linear increments. In another embodiment, the discrete voltage increments comprise non-linear increments. In yet another embodiment, the discrete voltage increments comprise a combination of linear and non-linear increments.

In one embodiment, the VID ramp is configured such that the voltage increments are made within the operating parameters and/or limitations of the power supply 120. For example, relevant limitations may include an operating frequency, a decoupling capacitance, and a source current limitation and a sink current limitation. In another embodiment, the voltage ramp may be configured such that the load may operate normally during the transition between the first voltage and the second voltage.

The compensated VID ramp may be adjusted in any appropriate manner, for example to reduce the lag time, increase the speed of the transition, and provide a stable voltage. For example, in one embodiment, the compensated VID ramp is configured to account for a voltage drop across an output capacitor. The voltage drop across the output capacitor may comprise a voltage drop $V_{esr}$ due to the ESR of the capacitor ($R_{esr}$). During a voltage transition, the voltage drop $V_{esr}$ caused by the resistance $R_{esr}$ drives the output voltage away from the target voltage, resulting in a longer voltage transition. The compensated VID ramp may compensate for the voltage drop $V_{esr}$ in any appropriate manner. For example, in one embodiment, when there is a positive voltage change, the voltage drop $V_{esr}$ is added to the new operating voltage and when there a negative voltage change, the voltage drop $V_{esr}$ is subtracted from the new operating voltage, resulting in a decreased settling time $T_{settle}$ and compensating for an underdamped response.

Figure 4:
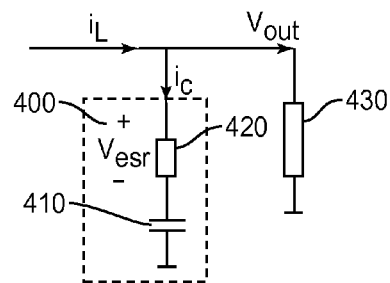
FIG. 4 is a schematic of a capacitor and a load.

Referring now to FIG. 4, an output capacitor 400 may be characterized as an ideal capacitor 410 and an ESR 420. An inductor current $i_L$ may be split between a load 430 and the output capacitor 400. The voltage drop $V_{esr}$ can be calculated in a number of ways. For example, in one embodiment, the voltage drop $V_{esr}$ may be measured by a suitable voltage measuring method. In another embodiment, the voltage drop $V_{esr}$ may be calculated as a function of the output voltage $V_{out}$, the ESR $R_{esr}$, and the capacitance C, such as according to the following equation:

$$V_{esr} = V_{out} \cdot \frac{s \cdot R_{esr} \cdot C}{1 + s \cdot R_{esr} \cdot C}$$

This equation may be transformed into a discrete time equivalent as shown in the following equation:

$$\frac{V_{esr}}{V_{out}} = \frac{(z-1)\frac{R_{esr} \cdot C}{T_s}}{1 + (z-1)\frac{R_{esr} \cdot C}{T_s}} = \frac{(z-1)}{K_{pesr} + (z-1)} = \frac{1 - z^{-1}}{1 - (1 - K_{pesr})z^{-1}}$$

where $$K_{pesr} = \frac{T_s}{R_{esr} \cdot C}$$

The voltage regulator 120 may include an adaptive voltage positioning (AVP) circuit to adjust the output voltage according to a measured output current. In one embodiment, the compensated VID ramp may be compensated for an output capacitor current $I_c$ compensation. The output capacitor current $I_c$ drives the measured output current away from the target voltage. The output capacitor current may be subtracted from the measured output current since the output capacitor current is being supplied to the output capacitor and not the load. By compensating for the output capacitor current $I_c$ the system may be less prone to producing an overdamped response.

The capacitor current $I_c$ may be calculated in any number of ways. In one embodiment, the capacitor current $I_c$ may be calculated by dividing the voltage drop $V_{esr}$ across the output capacitor by the output capacitor resistance $R_{esr}$. In another embodiment, the capacitor current $I_c$ may be measured using any suitable current measurement mechanism.

Figure 5:
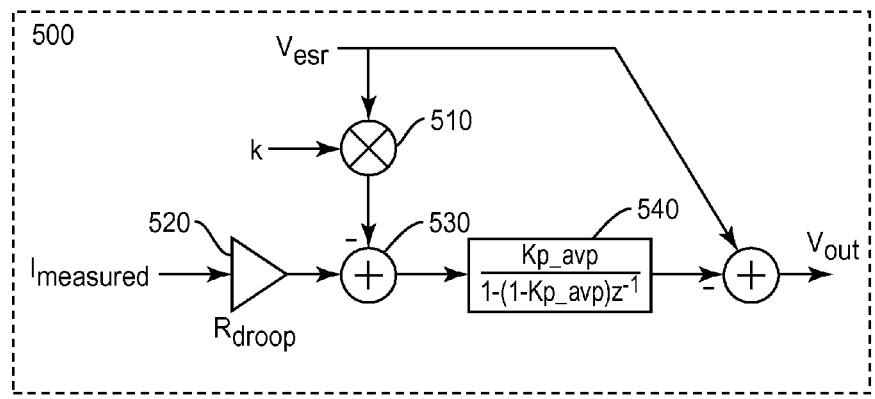
FIG. 5 is a schematic illustrating a circuit for compensating for output capacitor current.

Referring now to FIG. 5, in one embodiment, an exemplary capacitor current compensation circuit 500 compensates for the output capacitor current by multiplying the input $V_{esr}$ by a value k (510). In one embodiment, the value of k may comprise a constant. The measured output current $I_{measured}$ may be adjusted according to the droop resistance of the load (520) and the output capacitor current may be subtracted from the compensated output current (530). This current value may be used by the AVP circuit 550 and the AVP voltage may be subtracted from $V_{esr}$ and outputted.

Figure 6:
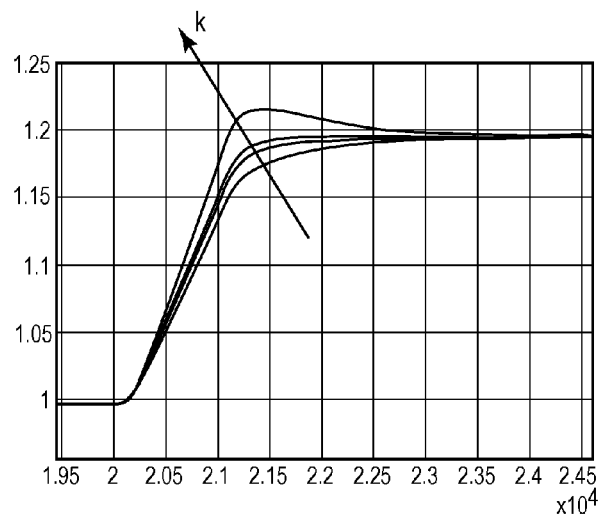
FIG. 6 illustrates an output voltage using different values of a constant k.

In one embodiment, the constant k and may be equal to $R_{droop}/R_{esr}$. In another embodiment of the invention, k may be a variable that may be manipulated to adjust the slew rate of the compensated VID ramp. Referring to FIG. 6, as the value of k increases, the overall speed or slope of the compensated VID ramp may be increased at the cost of additional voltage overshoot. Likewise, as the value of k is decreased, the speed/slope of the compensated VID ramp may be decreased, potentially resulting in a voltage undershoot.

In one embodiment, the value of k is dependent on the requirements of the load 110. The capacitor current compensation circuit 500 may also employ multiple k values for different VID transients. For example, one embodiment comprises two separate k values, one for up transients and one for down transients. In another embodiment, k comprises a first value for a small voltage transition and a second value for a larger voltage transition.

The compensated VID ramp my further include a post-ramp offset, for example added to the end of the compensated VID ramp. For example, referring to FIG. 7, a compensated VID ramp 710 may include a post-ramp offset comprising an offset amplitude 720 and a hold-time 730. The offset amplitude 720 and hold-time 730 may be programmable, static, or dynamic. For example, the programmable offset amplitude 720 and hold-time 730 may be configured to add a specific voltage to the end of the VID ramp 710 for a set period of time. In one embodiment, there may be a separate offset amplitude 720 and a separate hold-time 730 for different transient events. For example, in one embodiment, there are different post-ramp offset amplitudes 720 and hold-times 730 for up-ramps and for down-ramps. In one embodiment, the post-ramp offset may be configured so that the output voltage does not overshoot the target voltage. In another embodiment, the post-ramp offset may be configured so that the output voltage does not undershoot the target voltage.

Figure 7:
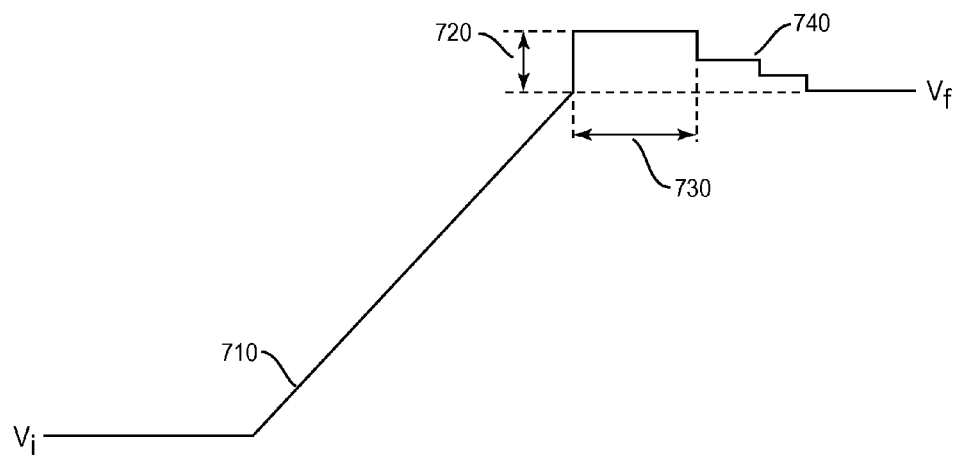
FIG. 7 illustrates a voltage ramp with a post-ramp offset.

Still referring to FIG. 7, the post-ramp offset may also comprise a slow decay 740 from the offset amplitude 720 to the new operating voltage $V_f$. In one embodiment, the slow decay 740 may comprise a series of discrete voltage increments starting at the offset amplitude 720 and ending at a new operating voltage $V_f$.

The various compensations to the VID ramp may be implemented in any suitable manner. For example, referring to FIG.

8, in one embodiment, each of the compensation parameters is generated in a compensated VID ramp circuit 800. The compensated VID ramp circuit 800 may comprise a VID ramp generator 810, a post-ramp offset generator 820, a voltage compensation circuit 830, a current compensation circuit 840, an AVP compensation circuit 850, a first summing circuit 860, and a second summing circuit 870.

The VID ramp generator 810 receives the first VID from the load 110. When the second VID is provided from the load 110, the VID ramp generator 810 produces a series of discrete voltage increments from the first VID voltage to the second VID voltage, forming a VID ramp between the first VID and the second VID. For each discrete voltage increment in the ramp, a new target voltage $V_{target}$ may be produced. The VID ramp generator 810 may also produce an end-of-ramp indicator for signaling when the ramp is substantially close to the new target voltage and/or has reached the new target voltage.

In the present embodiment of the compensated VID ramp circuit 800, the compensation parameters may be generated for each discrete voltage increment (dvid_setpoint). The compensation parameters comprise an ESR voltage compensation parameter and a capacitor current compensation parameter. The capacitor current compensation parameter may be subtracted from the measured output current $I_{measured}$ in the first summing circuit 860. Once the current compensation has been taken into effect, the AVP compensation circuit 850 uses the compensated output current to generate an AVP offset. Each of the compensation parameters may then be summed or subtracted in second summing circuit 870. When the end-of-ramp signal is activated, the post-ramp offset generator 820 generates a post-offset that may be added in second summing circuit 870. The second summing circuit 870 then outputs the compensated target voltage $V_{target}$.

Figure 9:
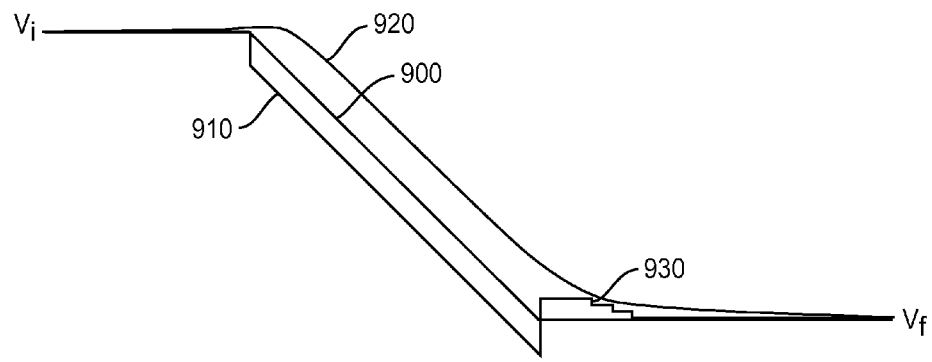
FIG. 9 illustrates a compensated voltage transition from a higher voltage to a lower voltage.

Referring to FIG. 9, a compensated VID down-ramp 910 may be compared to ideal voltage ramp 900 as well as an output voltage 920. The compensated VID down-ramp 910 comprises an ideal voltage ramp 900 that has been modified to take into account the capacitor current and the capacitor voltage drop. The compensated VID clown-ramp 910 further comprises a post-ramp offset 930 that may be configured to ensure the output voltage does not drop below the final voltage $V_f$.

Figure 10:
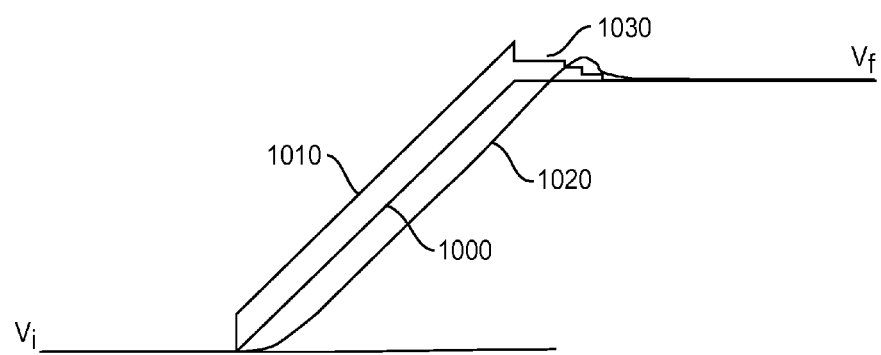
FIG. 10 illustrates a compensated voltage transition from a lower voltage to a higher voltage.

Referring now to FIG. 10, a compensated VID up-ramp 1010 may be compared to an ideal voltage ramp 1000 as well as an output voltage 1020. The compensated VID up-ramp 1010 comprises an ideal voltage ramp 1000 that has been modified to take into account the capacitor current and the capacitor voltage drop. The compensated VID up-ramp 1010 further comprises a post-ramp offset 1030 that may be configured to control the voltage overshoot above the final voltage $V_f$.

Figure 8:
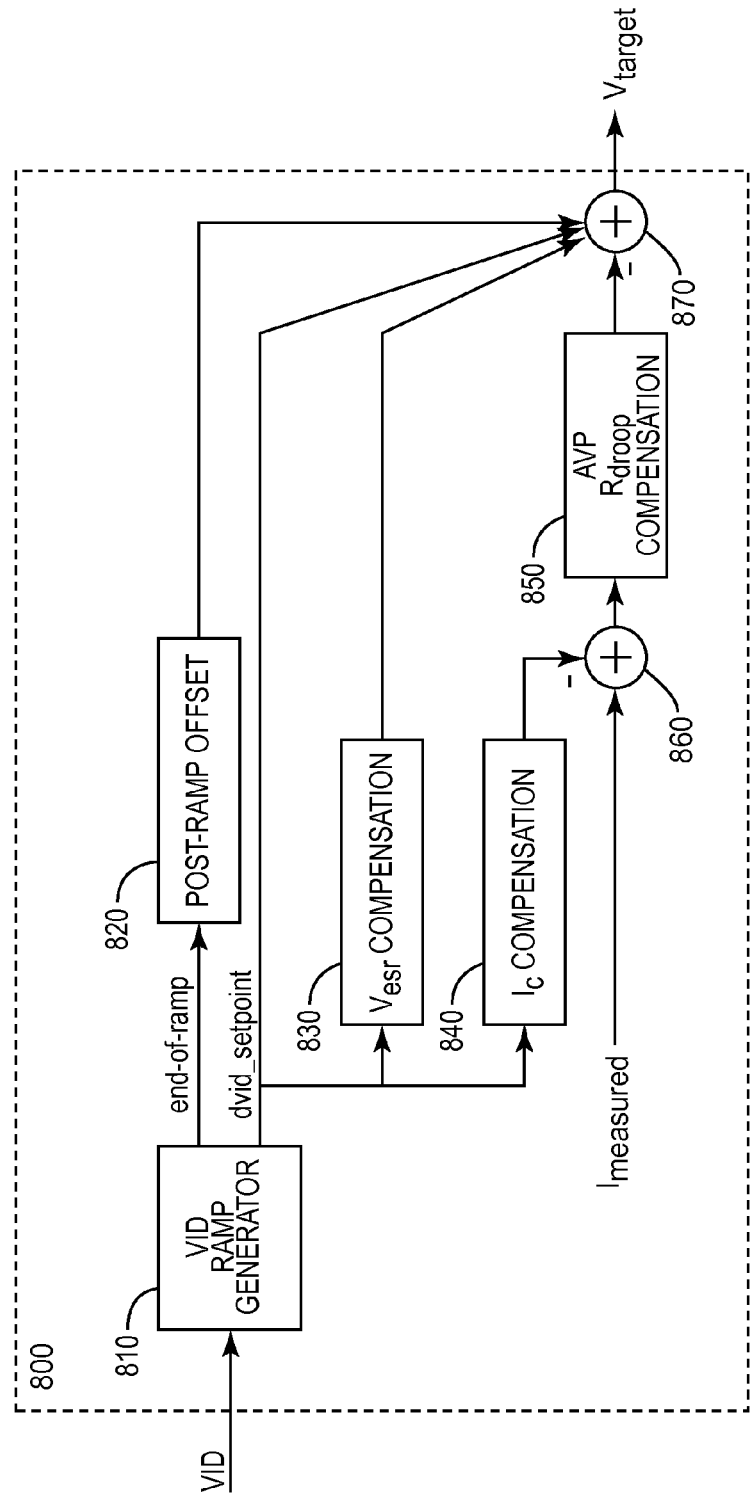
FIG. 8 illustrates a circuit configured to generate a compensated voltage ramp.
Figure 11:
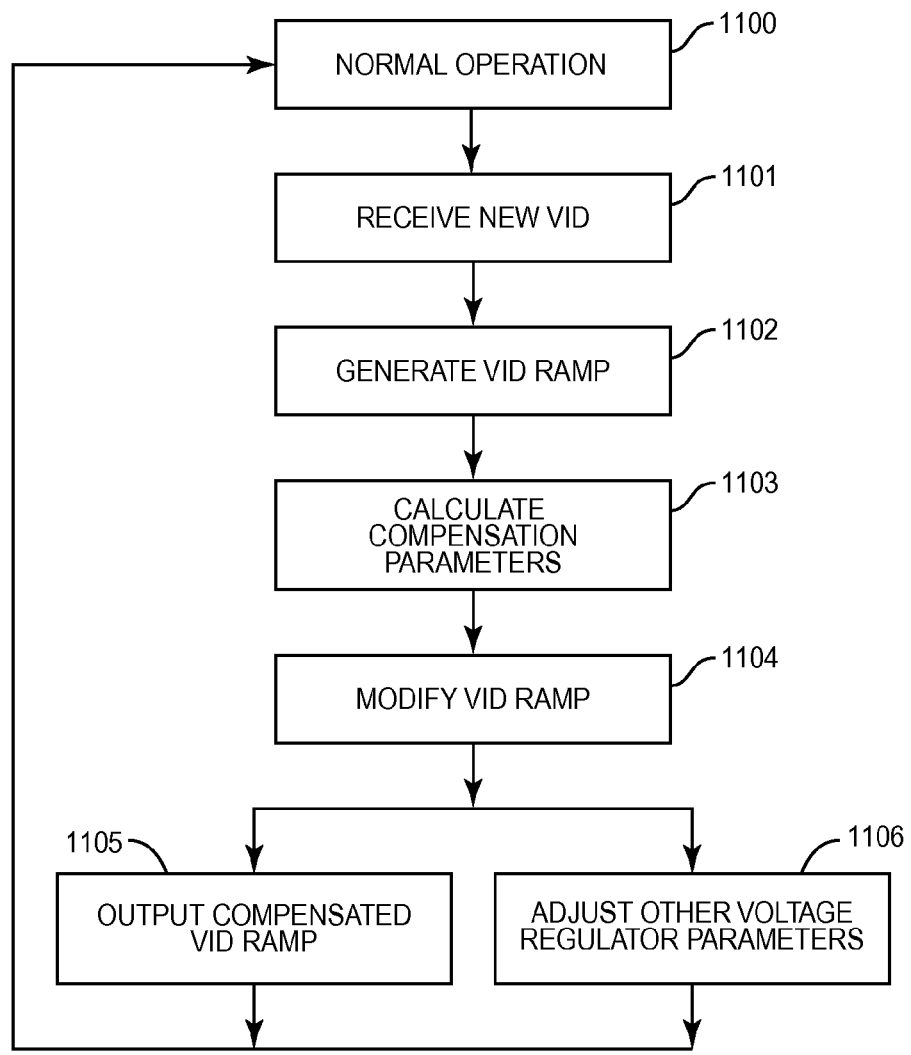
FIG. 11 illustrates a process for generating a compensated voltage ramp.

Referring now to FIG. 11 with continued reference to FIGS. 1 and 8, the voltage regulator 120 functions normally, providing power to the load 110 according to the VID (1100). After a change in a load condition, the load 110 may provide the voltage regulator 120 with a new voltage requirement in the form of a new VID (1101). The VID ramp circuit 800 may generate a VID ramp (1102), calculate a compensation parameter to apply (1103), modify the VID ramp according to the compensation parameter (1104), and output the compensated VID ramp (1105). In one embodiment, the compensation parameters comprise an capacitor current compensation and/or an capacitor voltage drop compensation. In another embodiment, the compensation parameters further comprise a post-ramp offset.

While outputting the compensated VID ramp, other voltage regulator parameters may be adjusted to help facilitate the voltage change (1106). In one embodiment, voltage regulation feedback settings, otherwise known as PID settings, may be adjusted dynamically according to the voltage ramp. In another embodiment, a pulse width modulator (PWM) output may be modified to accelerate the voltage transition. In another embodiment, an over-current protection and a maximum current limit may be modified to allow for temporary current increases. In another embodiment, the settings of an active transient response (ATR) circuit in the voltage regulator 120 may be modified.

For example, in one embodiment, a dynamic PID adjustment is generated during the voltage transition from the start of the compensated voltage ramp until the end of the hold time of the post ramp offset. The dynamic PID adjustment may comprise a proportional control adjustment, an integral control adjustment, and/or a derivative control adjustment. The dynamic PID adjustment may comprise a decreased accumulated error in the integral term and may allow for a smoother transient after the compensated VID ramp has completed and the power supply is supplying a steady state.

In one embodiment, the proportional control adjustment may comprise a proportional gain $K_p$ adjustment. In another embodiment, the integral control adjustment may comprise an integral gain $K_i$ adjustment. The proportional gain $K_p$ adjustment may comprise a current proportional gain $Kp_{current}$ modified by a proportional gain factor delta$_{Kp}$ scaled by a current target voltage $V_{target}$ generated by the compensated voltage ramp. The integral gain $K_i$ adjustment may comprise a current proportion gain $Ki_{current}$ modified by a integral gain factor delta$_{Ki}$ scaled by the current target voltage $V_{target}$ generated by the compensated voltage ramp. For example, in one embodiment, $K_p$ and $K_i$ are determined according to the following equations:

$$Kp_{new} = Kp_{current} + \text{delta}_{Kp} \times V_{target}$$

$$Ki_{new} = Ki_{curret} + \text{delta}_{Ki} \times V_{target}$$

In one embodiment, a low proportional gain $K_p$ adjustment and a low integral gain $K_i$ adjustment are used to minimize ringing time. In another embodiment, the values of the integral gain $K_i$ adjustment and the proportional gain $K_p$ adjustment may be offset. The proportional gain $K_p$ adjustment and the integral gain $K_i$ adjustment may be programmable over multiple octaves, and there may be various values for the proportional gain factor delta$_{Kp}$ and the integral gain factor delta$_{Ki}$ for different transient events.

Figure 12:
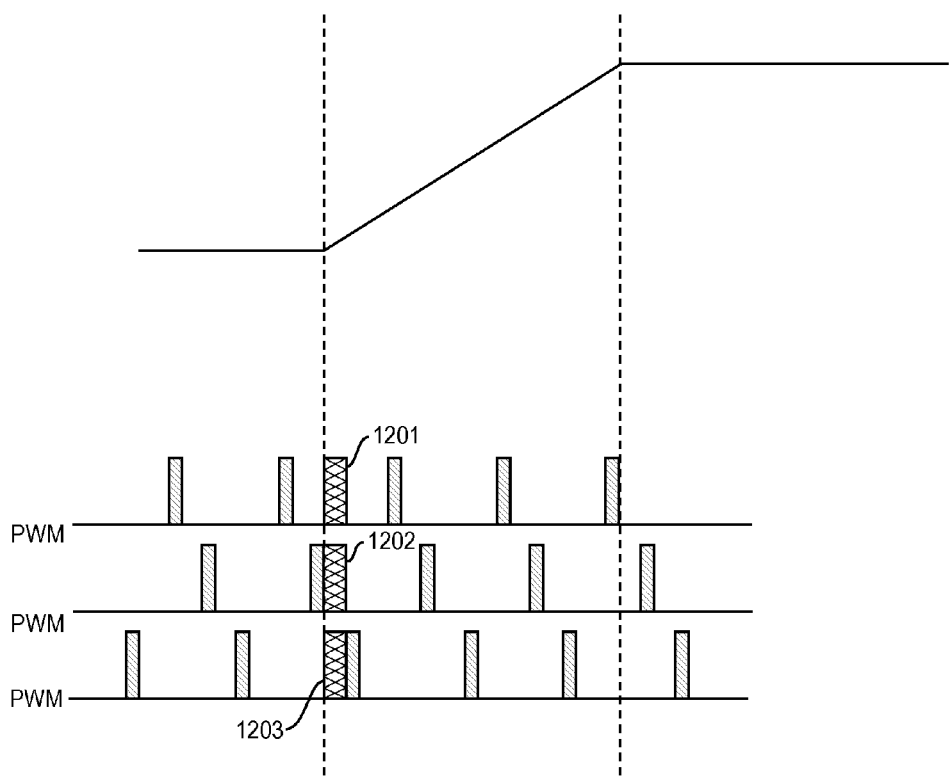
FIG. 12 illustrates a multiphase PWM output corresponding to a voltage ramp.

In another embodiment, the output of a PWM may be controlled to further expedite the voltage transition. Referring to FIG. 12, additional PWM pulses may be added during an up-ramp in order to increase the speed at which inductor current increases, thus increasing the slew rate of the voltage transition. Additional PWM pulses 1201, 1202, 1203 may be inserted at the beginning of the compensated VID ramp. Similarly, on a down-ramp, pulses may be removed to expedite the drop in inductor current, thus resulting in a faster transition to the lower voltage.

The voltage regulator 120 may be further configured to operate in conjunction with one or more protection parameters. The protection parameters may be configured to ensure the voltage regulator 120 is operating within safe operating parameters. In one embodiment, the protection parameters comprise an over-current protection parameter and a peak current limit. For example, the over-current protection parameter and peak current limit may comprise a series of parameters for individual phases and total voltage regulator limits. In one embodiment, the over-current protection (OCP) and peak current limits may be adjusted during the compensated VID ramp. Since the compensated VID ramp occurs over a finite duration, the OCP and peak current limits may be raised. The compensated VID ramp may require additional current to charge the output capacitance. By raising the OCP and peak current limits during the compensated VID ramp, the overall response time may be improved and nuisance OCP and peak current trips may be minimized.

In another embodiment, the VID ramp circuit 800 may be configured to adjust an ATR system, such as by modifying ATR threshold. Normally, the ATR system works to maintain a constant output voltage. For example, the ATR system may detect an ATR event if the output voltage deviates from a target voltage in excess of a threshold. In one embodiment, the target voltage may comprise the first VID modified by an active voltage positioning (AVP) circuit configured to modify the target voltage according to various conditions such as an output current. During the compensated VID ramp, an ATR event may be triggered due to the voltage transition and steps would be taken by the ATR system to maintain the output voltage at the first VID. This would be counterproductive when the load 110 is requesting a new output voltage. In one embodiment, the compensated VID ramp circuit 800 is configured to adjust an ATR threshold to avoid an ATR event during the voltage transition. In another embodiment, the compensated VID ramp circuit 800 may be configured to adjust an ATR threshold to induce an ATR event during the voltage transition.

In the foregoing specification, the invention has been described with reference to specific exemplary embodiments. Various modifications and changes may be made, however, without departing from the scope of the present invention as set forth in the claims. The specification and figures are illustrative, rather than restrictive, and modifications are intended to be included within the scope of the present invention. Accordingly, the scope of the invention should be determined by the claims and their legal equivalents rather than by merely the examples described.

For example, the steps recited in any method or process claims may be executed in any order and, unless otherwise noted, are not limited to the specific order presented in the claims. Additionally, the components and/or elements recited in any apparatus claims may be assembled or otherwise operationally configured in a variety of permutations and are accordingly not limited to the specific configuration recited in the claims.

Benefits, other advantages and solutions to problems have been described above with regard to particular embodiments; however, any benefit, advantage, solution to problem or any element that may cause any particular benefit, advantage or solution to occur or to become more pronounced are not to be construed as critical, required or essential features or components of any or all the claims.

As used herein, the terms "comprise", "comprises", "comprising", "having", "including", "includes" or any variation thereof, are intended to reference a non-exclusive inclusion, such that a process, method, article, composition or apparatus that comprises a list of elements does not include only those elements recited, but may also include other elements not expressly listed or inherent to such process, method, article, composition or apparatus. Other combinations and/or modifications of the above-described structures, arrangements, applications, proportions, elements, materials or components used in the practice of the present invention, in addition to those not specifically recited, may be varied or otherwise particularly adapted to specific environments, manufacturing specifications, design parameters or other operating requirements without departing from the general principles of the same.

What is claimed is:

1. A method of adjusting a voltage, comprising:
producing a voltage ramp starting at a first voltage and ending at a second voltage;
compensating the voltage ramp according to a compensation parameter, wherein the compensation parameter is configured to compensate for a circuit parameter;
outputting a voltage according to the compensated voltage ramp; and
compensating the voltage ramp for a second compensation parameter,
wherein at least one of:
the first compensation parameter is applied and substantially optimized for a positively-sloped voltage ramp and the second compensation parameter is substantially optimized for a negatively-sloped voltage ramp; and
the first compensation parameter corresponds to an output capacitor equivalent series resistance voltage drop and the second circuit parameter corresponds to an output capacitor current.

2. The method of claim 1, further comprising modifying PWM (pulse width modulation) pulses to increase a slew rate of the voltage ramp.

3. The method of claim 1, further comprising modifying a current limit according to the compensated voltage ramp.

4. The method of claim 1, wherein the output capacitor current comprises a scaled output capacitor current.

5. The method of claim 1, further comprising adding a post-ramp offset to an end of the voltage ramp.

6. The method of claim 5, wherein the post-ramp offset comprises a programmable amplitude offset and a programmable duration offset.

7. The method of claim 5, wherein the post-ramp offset further comprises a slow decay.

8. The method of claim 5, wherein the post-ramp offset comprises:
a first post-ramp offset configured to be applied to a positively-sloped voltage ramp; and
a second post-ramp offset configured to be applied to a negatively-sloped voltage ramp.

9. The method of claim 1, wherein the compensation parameter is further configured to control a lag in a change in output voltage.

10. The method of claim 1, wherein the compensation parameter is further configured to control an output voltage overshoot.

11. The method of claim 1, wherein the compensation parameter is further configured to control an output voltage undershoot.

12. The method of claim 1, further comprising updating a voltage regulator control loop parameter according to the compensated voltage ramp.

13. The method of claim 1, further comprising modifying an ATR (active transient response) threshold according to the compensated voltage ramp.

14. A voltage ramp circuit comprising:
a voltage ramp generator configured to output a voltage ramp starting at a first voltage and ending at a second voltage; and
a compensation circuit responsive to the voltage ramp generator, wherein the compensation circuit is configured to modify the voltage ramp according to a circuit parameter,
wherein the compensation circuit comprises a capacitor current compensation circuit configured to compensate for an output capacitor current.

15. The voltage ramp circuit of claim 14, wherein the compensation circuit comprises a post-ramp offset circuit configured to add a programmable amplitude and duration offset to an end of the voltage ramp.

16. The voltage ramp circuit of claim 15, wherein the programmable amplitude and duration offset according to whether the voltage ramp is positively-sloped or negatively sloped.

17. The voltage ramp circuit of claim 14, wherein the compensation circuit comprises an ESR compensation circuit configured to compensate for a voltage drop across an output capacitor.

18. The voltage ramp circuit of claim 14, wherein the capacitor current compensation circuit is configured to subtract the output capacitor current from a sensed output current.

19. The voltage ramp circuit of claim 14, wherein the capacitor current compensation circuit is further configured to be scaled by a programmable constant wherein the programmable constant is configured to:
control a voltage overshoot/undershoot; and
control a rate of the voltage ramp.

20. The voltage ramp circuit of claim 19, wherein the programmable constant comprises a first constant for an up transient and a second constant for a down transient.

21. A voltage ramp circuit, comprising:
a voltage ramp generator configured to output a voltage ramp starting at a first voltage and ending at a second voltage; and
a compensation circuit comprising:
an ESR compensation circuit configured to adjust the voltage ramp according to a voltage drop across an output capacitor;
an output capacitor current compensation circuit configured to adjust the voltage ramp according to an output capacitor current; and
a post-ramp offset circuit.

22. The voltage ramp circuit of claim 21, wherein the capacitor current compensation circuit is further configured to be scaled by a programmable constant wherein the programmable constant is configured to:
control a voltage overshoot/undershoot; and
control a rate of the voltage ramp.

23. The voltage ramp circuit of claim 22, wherein the programmable constant is selected from a first programmable constant for an up-ramp and a second programmable constant for a down-ramp.

24. The voltage ramp circuit of claim 21, wherein the post-ramp offset circuit is configured to generate an amplitude offset and a duration offset.

25. The voltage ramp circuit of claim 24, wherein the amplitude offset and the duration offset are programmable.

26. The voltage ramp circuit of claim 21, further comprising a circuit parameter modification circuit.

27. The voltage ramp circuit of claim 26, wherein the circuit parameter modification circuit is configured to adjust a voltage regulator control loop parameter.

28. The voltage ramp circuit of claim 26, wherein the circuit parameter modification circuit is configured to adjust an ATR (active transient response) threshold.

29. The voltage ramp circuit of claim 26, wherein the circuit parameter modification circuit is configured to control a PWM (pulse width modulation) pulse.

30. The voltage ramp circuit of claim 26, wherein the circuit parameter modification circuit is configured to modify a current limit.

* * * * *